United States Patent [19]
Kinder et al.

[11] 3,947,109
[45] Mar. 30, 1976

[54] APPARATUS AND METHOD FOR PROCESSING PHOTOGRAPHIC PAPER STRIP

[76] Inventors: Claude E. Kinder, 5634-F Via Romano, Charlotte, N.C. 28202; Robert L. Jones, Jr., 1308 Blue Jay Lane, Richmond, Va. 23223; Walter W. Marsh, 4114 Goldfinch Drive, Richmond, Va. 23234

[22] Filed: Aug. 8, 1974

[21] Appl. No.: 495,771

[52] U.S. Cl. ........................ 355/29; 355/41; 355/42; 355/112
[51] Int. Cl.[2] ........................ G03B 29/00
[58] Field of Search ............ 355/29, 40, 41, 42, 112

[56] References Cited

UNITED STATES PATENTS

| | | | |
|---|---|---|---|
| 3,516,741 | 6/1970 | Thaddey | 355/41 X |
| 3,718,807 | 2/1973 | Bracken | 355/29 X |
| 3,768,905 | 10/1973 | Williams | 355/112 X |
| 3,807,855 | 4/1974 | Zajac | 355/29 |
| 3,811,768 | 5/1974 | Zahn | 355/29 |

*Primary Examiner*—Monroe H. Hayes
*Attorney, Agent, or Firm*—Bell, Seltzer, Park & Gibson

[57] ABSTRACT

An apparatus and method for processing a paper strip wherein the paper strip is composed of a series of closely spaced photographic prints and wherein the paper strip has been marked with various indicia indicating the location of the prints and whether the prints are satisfactory. The apparatus includes means for advancing the strip along a path of travel, means for printing a customer identification number on each of the prints, means responsive to the indicia for cutting the strip between adjacent prints, and means responsive to the indicia for sorting the unsatisfactory prints into a separate receptacle.

11 Claims, 10 Drawing Figures

APPARATUS AND METHOD FOR PROCESSING PHOTOGRAPHIC PAPER STRIP

The present invention relates to an apparatus and method for inspecting, numbering, cutting, and sorting an elongated paper strip composed of a series of closely spaced photographic prints or the like, and is particularly directed to the processing of a paper strip which comprises a series of portraits taken by a commercial photographer.

In applicants' copending application Ser. No. 384,617, filed Aug. 1, 1973, there is disclosed an apparatus and method for editing a negative film strip composed of a series of closely spaced photographic negatives such that the film strip is adapted to automatically control various operations in a printing machine as the film strip is passed therethrough. The present invention is directed to an efficient and economical apparatus and method for processing of the paper strip of positive photographic prints produced by such printing machine.

The printing machine typically prints the images from the negative film strip on an elongated strip of positive printing paper which is maintained in wound roll form. Also, it is common to print a "cut" mark in the form of a photographic line in the margin of the paper strip between each portrait or print, such mark serving to facilitate the subsequent cutting of the strip into individual prints. In addition, it has beee proposed to include provision for placing a suitable mark on the paper strip to indicate the first print in a related series of prints and thereby facilitate the subsequent sorting and packaging of the prints for individual customers.

In the conventional processing of a positive paper strip of the described type, the photographer assigns a sequential customer identification number for each customer, and this number is printed or stamped on the back of each print belonging to the customer. Such numbering facilitates the subsequent packaging and delivery of the prints to the customer, and is presently accomplished on an apparatus wherein the roll is manually advanced across a table in increments and so that the prints are sequentially positioned at a viewing and printing station. The operator then actuates one of two foot pedals to apply the number to the underside of each print, one foot pedal being designed to print only the number, while the second foot pedal advances the printing mechanism to the next number and then prints. Thus the second pedal is employed in association with the first print in a new series of related prints (i.e., where the photographed subject changes) while the first pedal is used to number the remaining prints in ther series. The operator must also periodically check the number being applied to the prints against the record provided by the photographer to insure that any errors made by the photographer in assigning numbers or the operator of the numbering apparatus are corrected. As will be apparent, the above numbering system makes it difficult to control the exact position at which the number is placed on the prints, and there are many opportunities for error in printing the right number on the prints.

After numbering, the positive paper strip is fed through a cutter which includes a sensor for monitoring the marginal cut marks between the prints. In this regard, the cutters of present design sense one print behind the point of cutting, and this results in difficulty in properly framing the prints.

The individual prints are next inspected so that the unsatisfactory prints can be reprinted (e.g., where the exposure setting in the printer should be adjusted), or discarded in those cases where the print is totally unsatisfactory (e.g., where the picture is blurred). The prints are then sorted by number, packaged, and the number corresponding to the customer identification number is written on the outside of the package. These operations are all performed by hand, and are time consuming and therefore costly. In addition, where the volume of processed prints is large, a number of separate employees is required to inspect, sort, and package the prints, and since it requires a great deal of experience and training to properly inspect the prints, uniformity in the inspection process is difficult to achieve.

It is accordingly an object of the present invention to provide an apparatus and method for rapidly and efficiently inspecting, numbering, cutting, and sorting a strip of photographic prints, and which accomplishes these operations in a manner which avoids the above noted difficulties in the presently employed system.

It is another object of the present invention to provide an apparatus and method for inspecting the strip of photographic prints in roll form and prior to cutting the individual prints, such that a single, trained operator may rapidly inspect a large number of prints and so that substantial uniformity in the quality of the prints sent to the customer may be achieved and any errors in the numbering sequence may be readily detected.

It is another object of the present invention to provide an apparatus and method for inspecting a strip of photographic prints of the described type and wherein the individual prints may be marked to indicate those prints which should be reprinted, to indicate those prints which are totally unsatisfactory, or to indicate that the numbering sequence is in error.

It is still another object of the present invention to provide an apparatus and method for printing a customer identification number on each of the prints related to a single customer, and with each print in a related series including a letter to facilitate re-ordering of specific prints by the customer. Further, the apparatus and method of the present invention are adapted to print the numbers at a consistent location on all of the prints to thereby permit the packaging of the prints in an envelope having a window therein which reveals the numbers on the prints.

It is a further object of the present invention to provide an apparatus which is adapted to cut the individual prints from the paper strip directly along the cut mark applied by the printer such that the proper framing of the print may be assured.

It is another object of the present invention to provide an apparatus of the descibed type which efficiently sorts the individual cut prints into a plurality of separate stacks according to the markings which have been applied by the inspector while the prints are in roll form.

It is yet another object of the present invention to provide an apparatus of the described type which is designed to automatically stop whenever an error in the numbering sequence is indicated on the prints, thereby permitting the re-setting of the number printing mechanism.

These and other objects and advantages of the present invention are achieved in the embodiment illustrated herein by the provision of an apparatus which includes means for advancing the paper strip along a path of travel, first sensing means for terminating the advance of the strip upon sensing a cut mark appearing on the advancing strip, means for severing the strip along the cut mark after termination of the advance of the strip, means for reactuating the advance of the strip upon completion of thte severing operation, and means responsive to the "reprint" mark and the "reject" mark for sorting the cut prints into three separate stacks comprising a first stack of satisfactory prints, a second stack of prints which require reprinting, and a third stack of prints which are totally unsatisfactory.

Where the film strip further includes a "stop" mark positioned with respect to those prints which are out of numerical sequence, and an "end of series" mark positioned with respect to the final print in a related series of prints, the apparatus may further include means for sensing either a stop or an end of series mark and then terminating the advance of the strip.

Some of the objects of the invention having been stated, others will appear as the description proceeds, when taken in connection with the accompanying drawings, in which FIG. 1 is a perspective view of an apparatus for processing a photographic paper strip and which embodies the features of the present invention;

Figure 6:
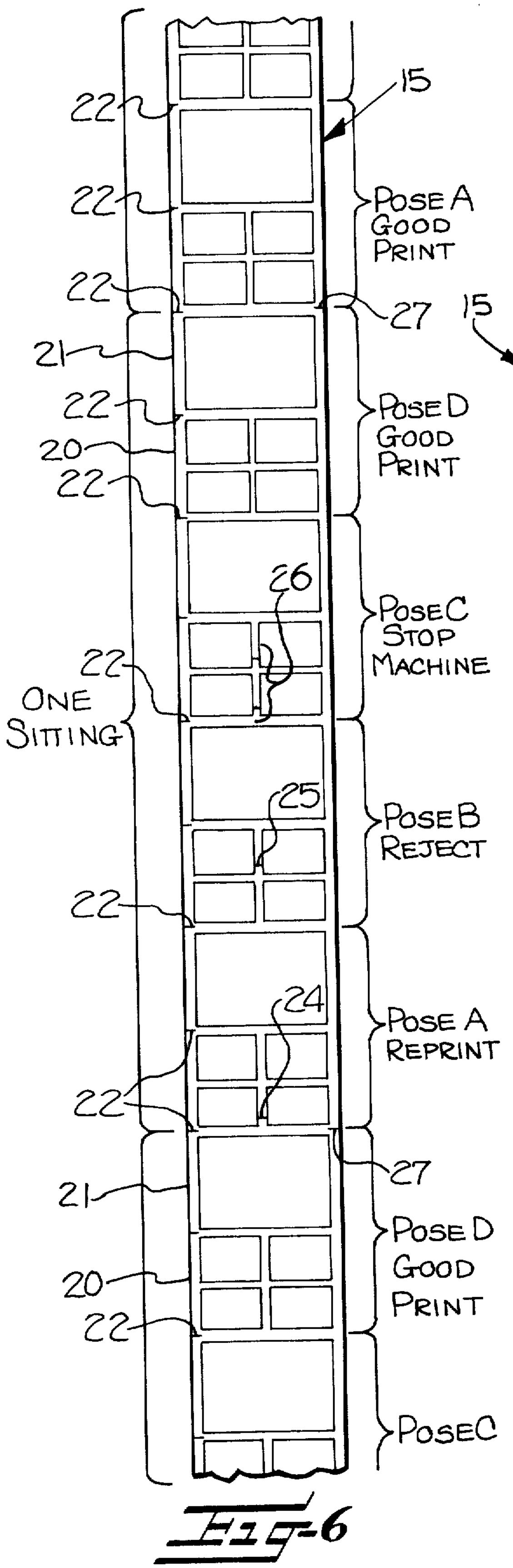
FIG. 6 is a plan view of a section of a paper strip of the type employed with the present invention and illustrating the various indicia which are adapted to be positioned thereon.

Referring more particularly to the drawings, an elongated paper strip 15 of the type adapted to be processed by the present invention is illustrated somewhat schematically in FIG. 6. More particularly, the strip 15 is composed of a series of closely spaced photographic prints, and in the illustrated embodiment, each portrait or pose is printed in the form of a first print 20 comprising four relatively small pictures and a second print 21 comprising one relatively large picture.

The strip 15 includes a first indicium or cut mark 22 in the form of a photographic line in the left side edge margin of the strip between each of the prints. Such cut mark is conventionally positioned on the strip during the printing operation by means of a small light bulb, which when lighted, directs a beam of light through a slot and onto the print paper to form a small dark line in the margin thereof.

The strip 15 may further include a number of different indicia positioned thereon by an inspector while the strip is in roll form. More particularly, the inspector may manually place a second indicium or reprint mark 24 by means of a film marker pencil or the like at a predetermined location with respect to those prints which have been determined to require reprinting, and a third indicium or reject mark 25 at a predetermined location with respect to those prints which have been determined to be totally unsatisfactory. Further, in the event the inspector has determined from the customer record supplied by the photographer that the numbering of the prints is out of sequence for some reason, a fourth indicium or stop mark 26 may be positioned at a predetermined location on the strip. In the illustrated embodiment, this stop mark 26 comprises a mark positioned at both the predetermined location for the reprint mark 24 and the predetermined location of the reject mark 25. In other words, the presence of both the reprint and reject marks represents the stop mark.

The illustrated strip also includes a fifth indicium or end of series mark 27 which may be positioned on the strip during the printing operation. This mark represents the last pose or print in a series of prints taken of the same subject or customer, and typically comprises a photographic line similar to the cut mark 22, but positioned in the opposite side edge margin of the strip.

In the case of the particular paper strip 15 as illustrated in FIG. 6, the reprint and reject marks are designed to be positioned centrally on the strip, with the reprint mark 24 being positioned generally in alignment with the two lower small pictures of the print 20 and the reject mark 25 being positioned generally in alignment with the two upper small pictures of the print 20. As will become apparent, these locations have the advantage of permitting a single sensor to monitor each of the reprint, reject, and stop marks. However, it will be understood that other locations for these marks could be chosen. Further, it will be apparent that the presence of any of these marks on the print 20 will also control the processing of the associated print 21 of the same portrait or pose.

The apparatus of the present invention is illustrated in FIGS. 1-5, and comprises a generally box-like frame 30 which supports a freely rotatable shaft 32 for mounting a wound roll 33 of the film strip 15 thereon. The shaft 32 includes a rear flange 34 fixedly carried thereon, and a removable front flange 35 which permits the placement of the roll 33 thereon. If desired, the shaft 32 may include a suitable drag control adjustment (not specifically illustrated) for providing a degree of resistance to free rotation and thereby precluding the uncontrolled unwinding of the paper strip 15 from the roll 33.

The paper strip 15 is fed upwardly from the roll 33 and over a non-driven idler roller 37 which has a pair of spaced guide flanges 38 and 39 carried thereon. The strip is then directed verically downwardly between a drive shaft 42 and cooperating idler roll 43. The drive shaft 42 includes a composite plastic or rubber surface to frictionally engage the strip, and is cyclically driven to advance the strip by a drive arrangement which includes the electric motor 45. The motor acts through a gear reduction mechanism 46 to rotate the drive belt 47 and pulley 48, and the pulley is operatively connected to the drive shaft 42 by a conventional electrically controlled brake 50 and clutch 51. As will be described more fully below, the rotation of the pulley 48 is thus selectively transmitted to the drive shaft 42 to advance the strip when the clutch 51 is engaged and the brake 50 is disengaged, and the rotation of the drive shaft 42 is stopped to terminate the advance of the strip by disengaging the clutch 51 and engaging the brake 50.

The idler roll 43 is carried on an eccentrically mounted shaft 52 such that the idler roll 43 may be separated from the drive shaft 42 to facilitate the initial threading of the strip 15 therebetween. Also, the shaft 52 carries a lever arm 54 at the front of the apparatus which permits the operator to rotate the shaft 52 and effect the eccentric movement of the idler roll 43.

Figure 7:
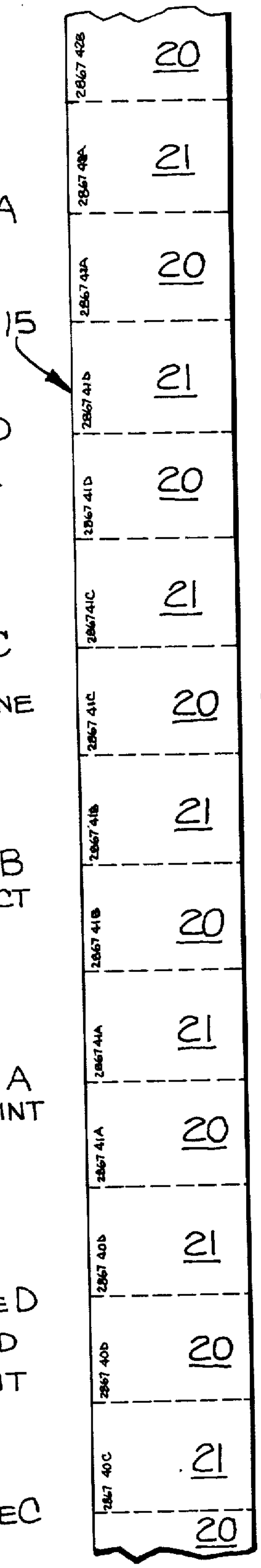
FIG. 7 is a plan view of the reverse or underside of the paper strip shown in FIG. 6.

From the drive shaft 42, the strip continues downwardly between a fixed plastic guide sheet 56 and a cooperating metal backup plate 57. An electrically operated numbering unit 58 is mounted along the rear side edge of the plate and is designed to sequentially print a series of numbers and letter on each print in the manner best illustrated in FIGS. 7–9. More particularly, the numbering unit 58 is designed to print through a suitable slot (not shown) in the plastic sheet 56 and against the backup plate 57 which serves to support the strip 15.

Figure 8:
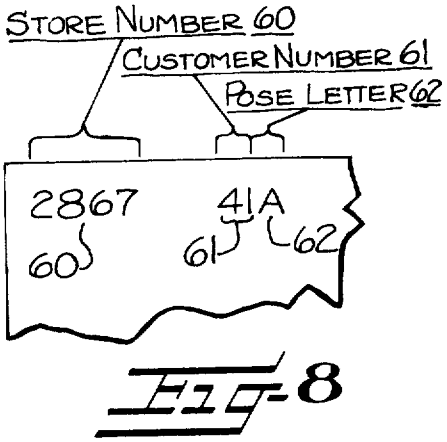
FIG. 8 is an enlarged fragmentary plan view of a portion of the underside of the paper strip and illustrating a typical numbering arrangement for the prints.
Figure 9:
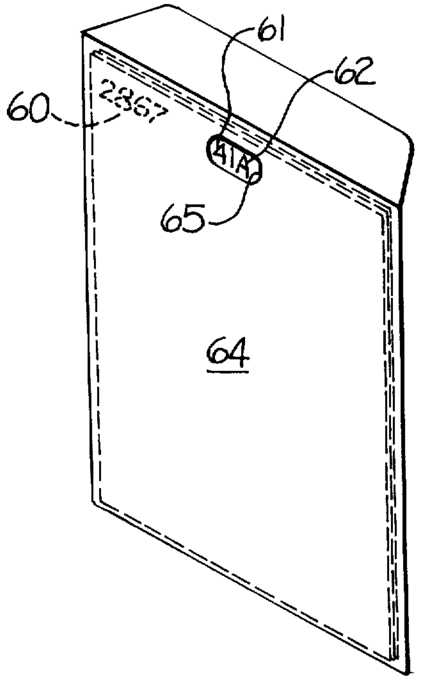
FIG. 9 is a perspective view illustrating a number of individual prints packaged in an envelope and illustrating the window which reveals the customer number and pose letter.

As illustrated in FIGS. 8–9, the numbering unit 58 applies a store number 60 and a customer identification number 61 as supplied by the photographer, as well as a pose letter 62 indicating the particular pose in each sitting. The pose letter sequentially advances after being applied to both prints 20 and 21 of each pose, and thus the presence of the pose letter permits the customer to readily designate a particular pose in a series of pictures when reordering additional prints of such pose. Further, it will be apparent that the printed numbers and letter appear at substantially the same location on each print, and thus the prints may be positioned in an envelope 64 (note FIG. 9) having a window 65 therein through which the customer identification number 61 and pose letter 62 is visible. This arrangement eliminates the need for manually writing the customer identification number on the outside of the envelope and thus facilitates the sorting and packaging operations.

The numbering unit 58 itself is conventional, and is electrically controlled to advance the pose letter 62 after printing the underside of both prints 20 and 21 of each pose, and to advance the customer identification number 61 after the end of series mark 27 is sensed as more fully explained below. In addition, the numbering unit 58 utilizes a roll of dry inking ribbon 67 which is mounted on the supply spool 68 and directed through the numbering unit. Upon leaving the numbering unit, the ribbon 67 is directed between the feed wheel 69 and spring biased pressure roll 70, the feed wheel 69 being cyclically rotated by a stepping motor 71 (FIG. 5) to advance the ribbon 67 through the unit. Also, a spring tension arm 72 of conventional design is positioned along the path of travel of the ribbon to maintain a proper degree of tension on the ribbon. A numbering unit of the above type is manufactured by Hecon Corporation, Eatontown, N.J., under the designation Model TP 900-18.

Figure 1:
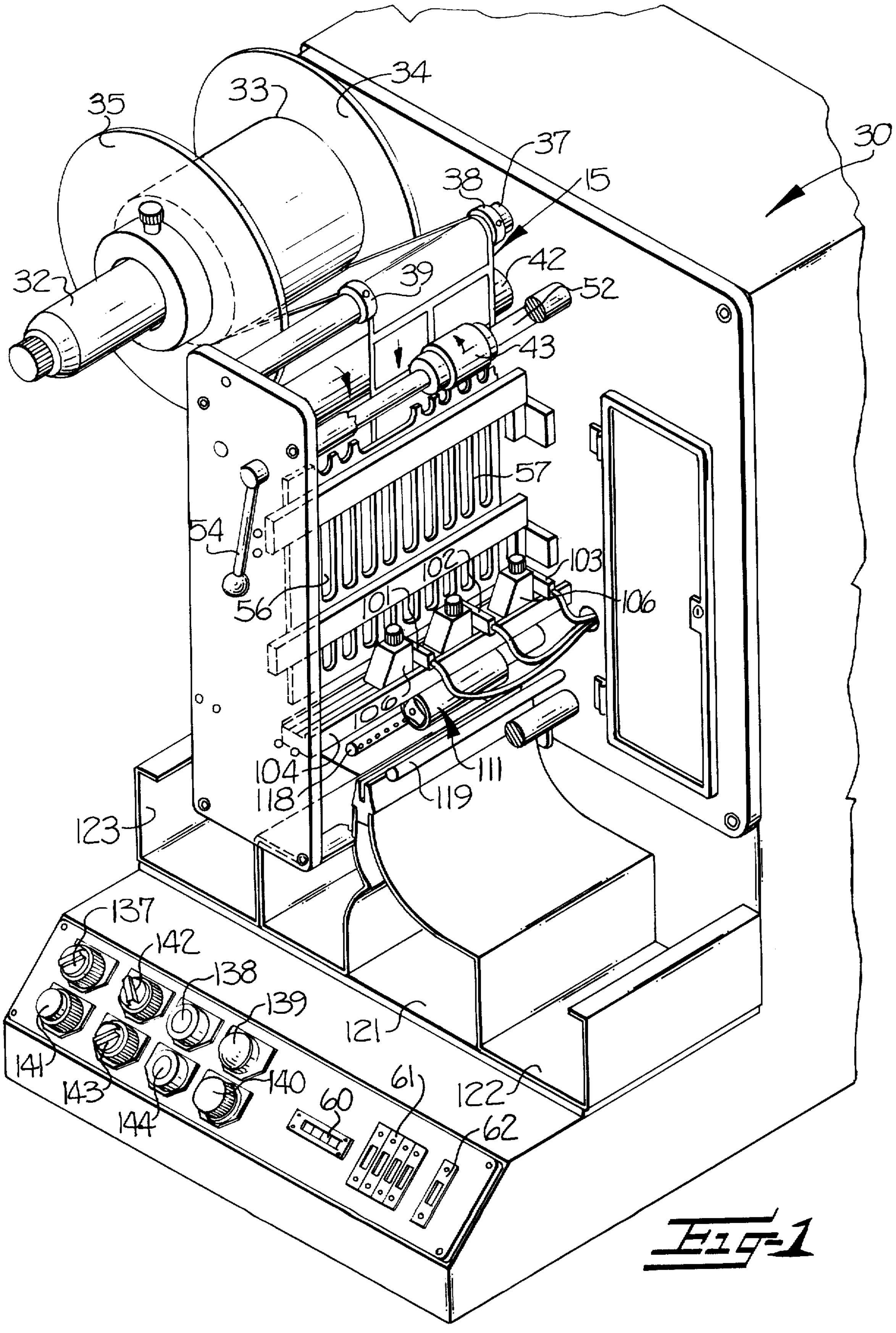
Figure 2:
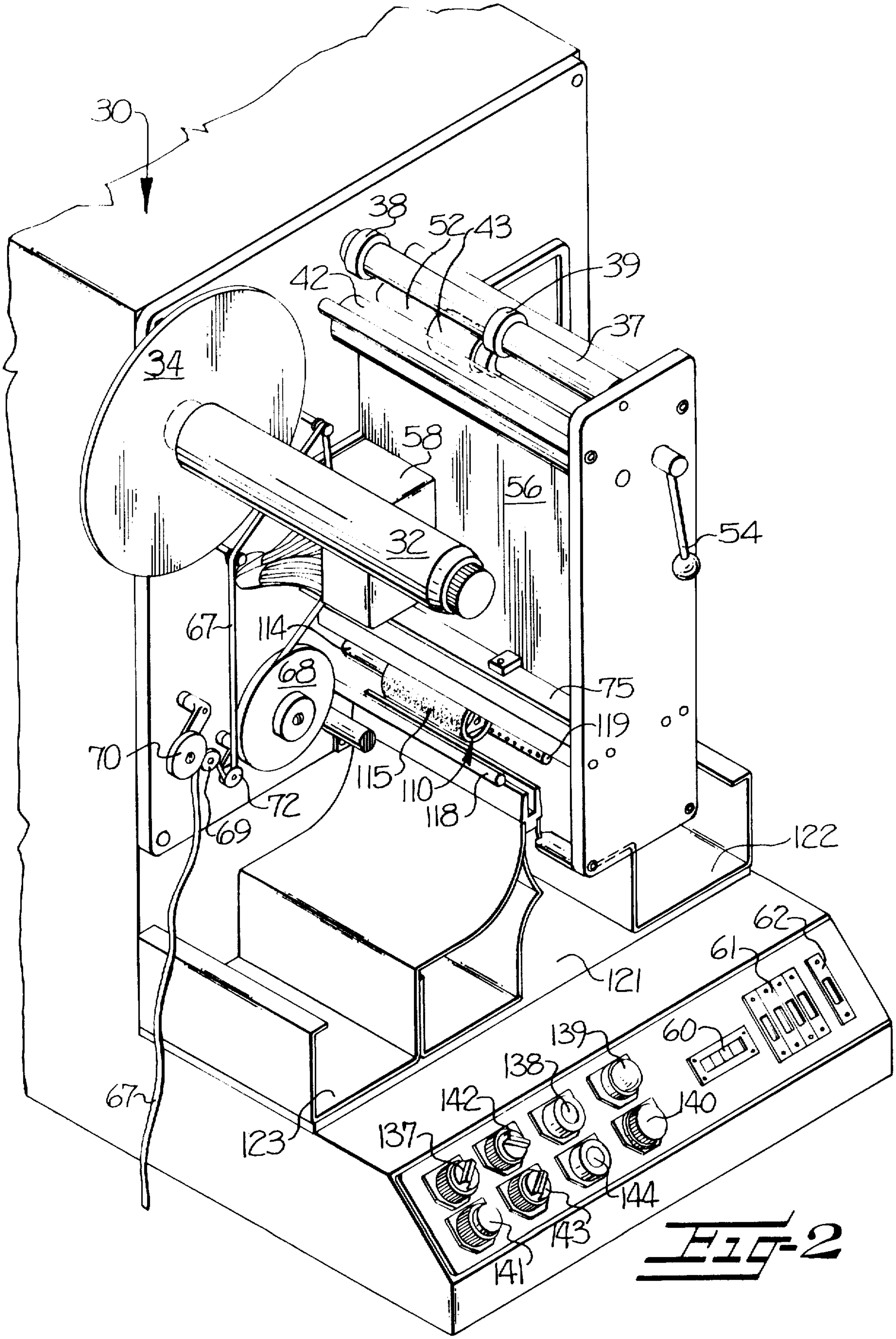
FIG. 2 is a perspective view of the apparatus shown in FIG. 1 and taken from a different angle.
Figure 3:
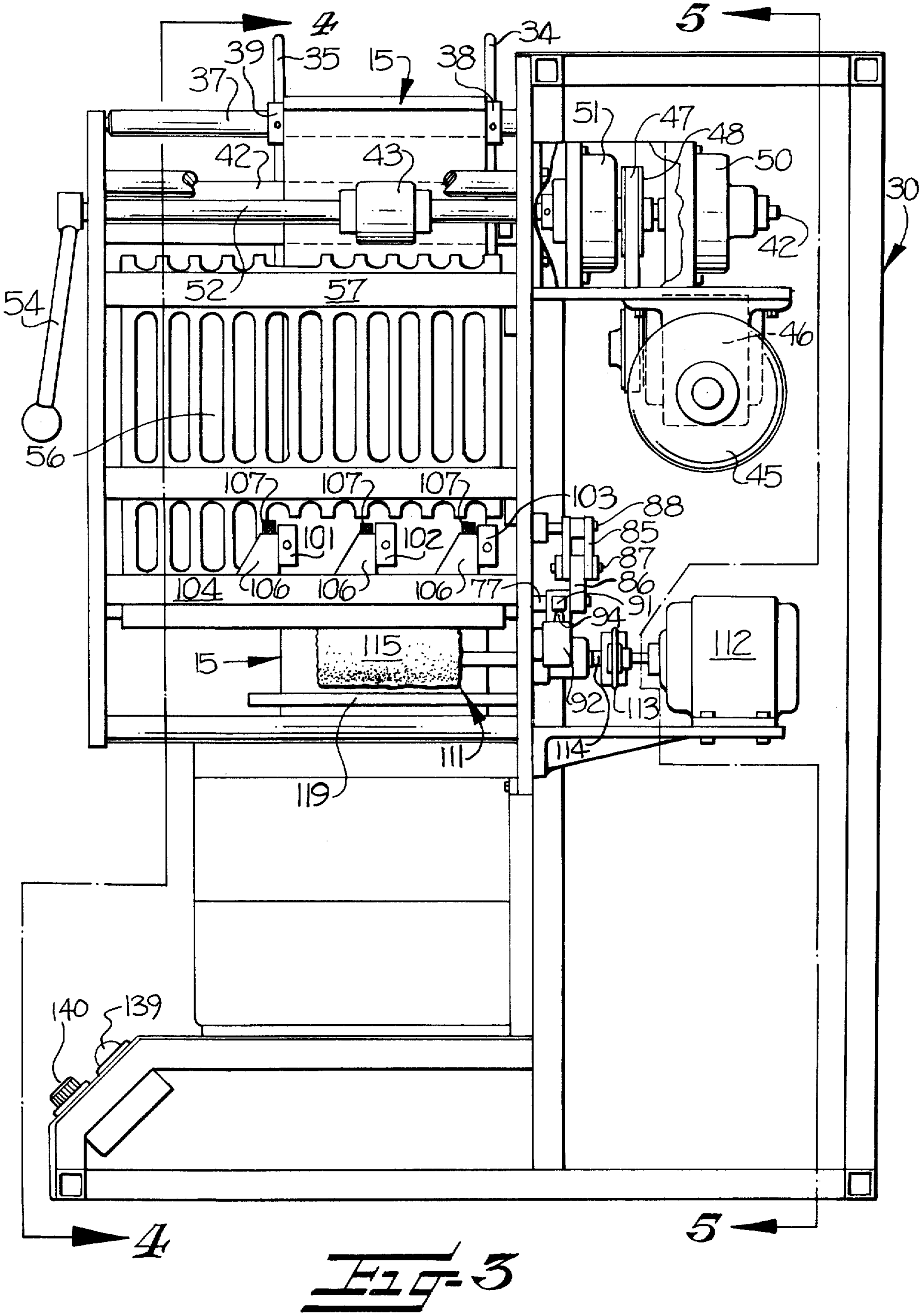
FIG. 3 is a side elevation view, partly broken away, of the apparatus shown in FIG. 1.
Figure 4:
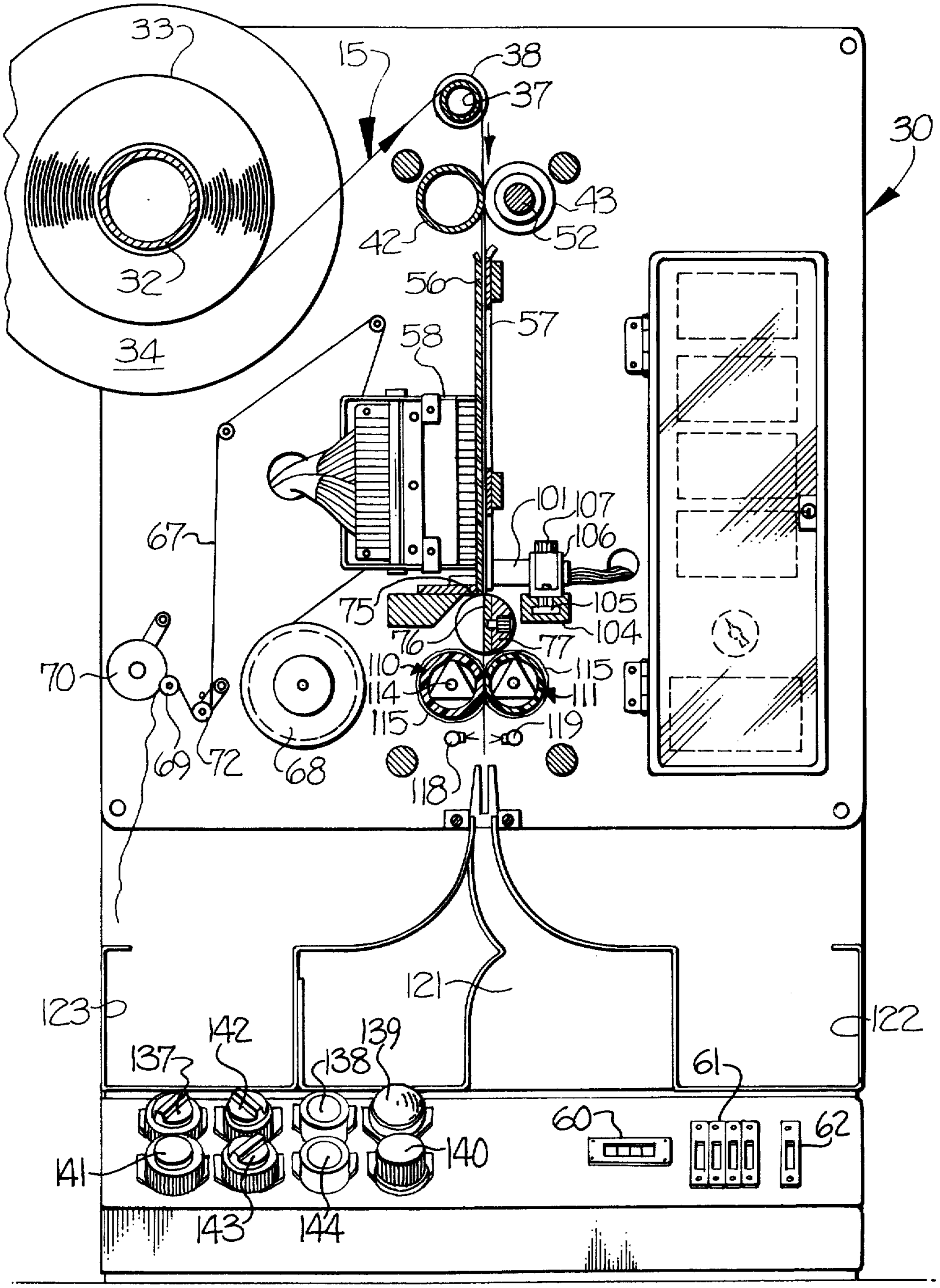
FIG. 4 is a front elevation view of the apparatus and taken substantially along the line 4—4 of FIG. 3.

A mechanism for cutting the paper strip between adjacent prints is mounted immediately below the lower end of the sheet 56 and plate 57, the mechanism including a fixed blade 75, and a cooperating blade 76 carried on the cutting shaft 77. Thus upon counterclockwise rotation of the shaft 77 as seen in FIG. 4, the blade 76 is advanced against the fixed blade 75 to cut the strip which is positioned therebetween. Preferably, the fixed blade 75 will be positioned at a slight angle with respect to the blade 76 so that a shearing action is achieved during the cutting operation as opposed to a chopping action.

Figure 5:
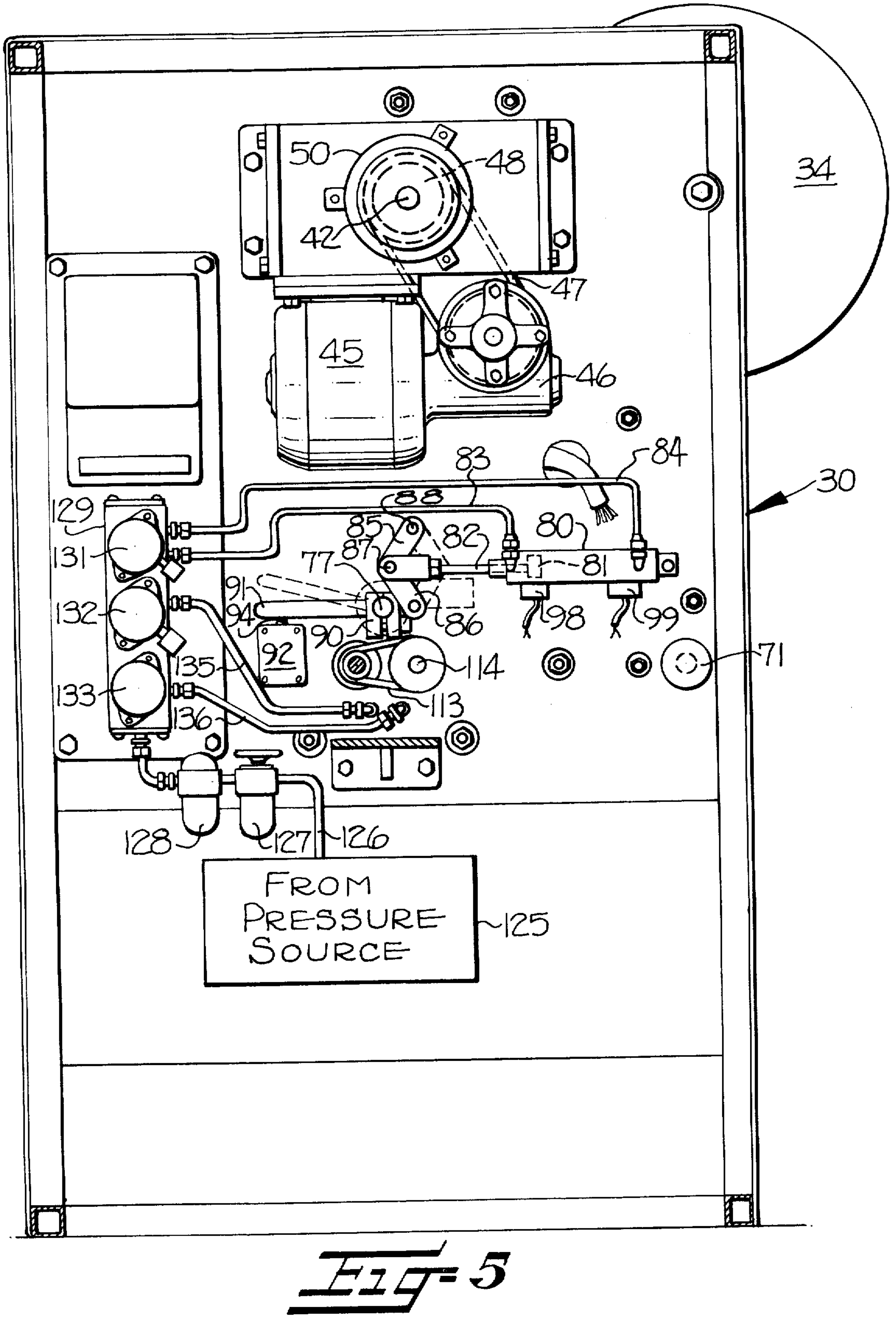
FIG. 5 is a rear elevation view of the apparatus and taken substantially along the line 5—5 of FIG. 3.

The cutting shaft 77 is oscillated about its axis to effect the cutting operation by a pneumatic arrangement as best seen in FIG. 5, and which comprises an air cylinder 80 having a piston 81 and connecting rod 82 slidably mounted therein. A first air line 83 is connected at one end of the cylinder, and a second air line 84 is connected at the other end. The free end of the rod 82 is operatively connected to a toggle mechanism which includes first and second linkages 85 and 86, respectively, with the two linkages being pivotally connected to each other and to the rod at 87. The upper end of the first linkage 85 is pivotally connected to the apparatus at 88, and the lower end of the second linkage 86 is pivotally connected to a bracket 90 which in turn is fixedly carried on the cutting shaft 77. Thus upon translation of the piston 81 toward the right as seen in FIG. 5, the toggle mechanism moves from the solid line position to the dashed line position to first rotate the cutting shaft 77 in a clockwise direction (which effects the cutting operation), and then rotate the shaft 77 in the reverse direction to return the shaft and cutting blade 76 to their original position. Similarly, upon the return of the piston 81 toward the left from the dashed line position, the cutting shaft 77 is oscillated in the same manner so as to effect the cutting operation and then return to its initial position. Thus the cutting operation is effected upon each stroke of the piston 81.

The bracket 90 on the cutting shaft 77 also carries a laterally directed lever arm 91 as seen in FIG. 5. The lever arm is adapted to rest upon the limit control 92 which is fixedly mounted on the frame and thereby defines the initial position of the cutting shaft 77. Further, the limit control 92 may include an upwardly facing spring biased button 94 which serves to cushion or dampen the impacts between the lever arm 91 and limit control 92.

A pair of magnetic reed switches 98 and 99 are mounted immediately adjacent the air cylinder 80 for the purposes fully set forth below. The first reed switch 98 is mounted adjacent the left end of the cylinder, as seen in FIG. 5, with the second switch 99 mounted adjacent the right end thereof, in order to actuate these switches, the piston 81 may be fabricated from a magnetic material such as iron, while the air cylinder 80 is made from a non-magnetic material such as aluminum. Thus each of the switches 98 and 99 is closed by the piston reaching the associated end of the cylinder.

A number of sensors are mounted immediately adjacent the cutting mechanism for detecting the indicia carried on the film strip 15. In the illustrated embodiment, three such sensors 101, 102, and 103 in the form of conventional photoelectric cells are mounted on a bracket 104 having a T-shaped channel 105 therein. A mounting block 106 is associated with each sensor, and includes a manually operable threaded member 107 for securing the block in the channel 105 at a selected lateral location on the bracket 104. As will thus be apparent, the number of the sensors may be readily varied, and the lateral and vertical positioning of the sensors may be manually adjusted. Also, it will be seen that the first sensor 101 is positioned along one edge of the strip to detect the cut mark, the second sensor 102 is positioned centrally of the strip to detect the reprint, reject and stop marks, and the third sensor 103 is positioned along the opposite edge of the strip to detect the end of series mark. As best seen in FIG. 4, the "cut" mark sensor 101 is mounted immediately (typically about ⅛ to ¼ inch) above the line of cut of the cutting mechanism for the reasons set forth below.

A drive roll 110 and cooperating idler roll 111 are mounted immediately below the cutting mechanism to advance the severed prints vertically downwardly. The roll 110 is continuously rotated by the second electric motor 112 which acts through the speed reduction pulley 113 to rotate the shaft 114 which carries the roll 110. The two rolls 110, 111 are laterally spaced from each other so that they only lightly engage the prints since the prints will be held stationary for a short period of time during the cutting operation. Also, these rolls are preferably covered with a soft fabric material 115 to avoid damage to the prints, and it will be noted that the drive roll 110 is positioned to engage the rear side of the prints so as to further ensure against damage.

A sorting mechanism is positioned immediately below the rolls 110, 111, and is adapted to utilize the fact that the strip is moving in a vertically downward direction to achieve a highly efficient and rapid sorting operation. More particularly, the sorting mechanism includes first and second air nozzles 118, 119 for selectively directing the severed prints into one of three recceptacles 121, 122, and 123. The nozzles take the form of hollow tubes having a number of apertures along one side thereof, with the first nozzle 118 being positioned to direct a stream of air horizontally toward the right as seen in FIG. 4 to thereby deflect the leading end of the downwardly moving severed print laterally into the second receptacle 122. Similarly, the second air nozzle 119 is positioned to direct a stream of air horizontally toward the left as seen in FIG. 4 to thereby deflect the leading end of the downwardly moving severed print laterally into the third receptacle 123. When neither the first nor second air nozzle is operative, the downwardly moving severed print falls vertically into the underlying first receptacle 121.

The air control system for operating the air cylinder 80 and first and second air nozzles 118, 119 is illustrated in FIG. 5, and comprises a pressure source 125 having an entry line 126 leading through a conventional regulator 127 and filter 128 into a manifold 129. Three air solenoid valves 131, 132, 133 of conventional design are operatively connected to the manifold 129, the first valve 131 being designed to selectively direct air through the first and second lines 83 and 84 to the cylinder 80 thereby controlling movement of the piston 81 and cutting mechanism. The second valve 132 selectively controls the entry of air into the line 135 which is connected to the second air nozzle 119, and the third valve 133 controls entry of air into the line 136 which is connected to the first air nozzle 118.

The front panel of the apparatus conveniently mounts a number of control switches and indicators as seen in FIG. 4. As illustrated, the front panel mounts a master on-off switch 137, a start button 138, a stop button 139, a reset button 140, an indicator light 141, a sort control switch 142, a numbering control switch 143, and a cut button 144. The function of these various switches and controls will be described below. Further, the front panel of the apparatus mounts a series of windows for displaying the store number 60, the customer identification number 61, and the pose letter 62 as programmed in the numbering unit 58.

Operation of the Apparatus

Figure 10:
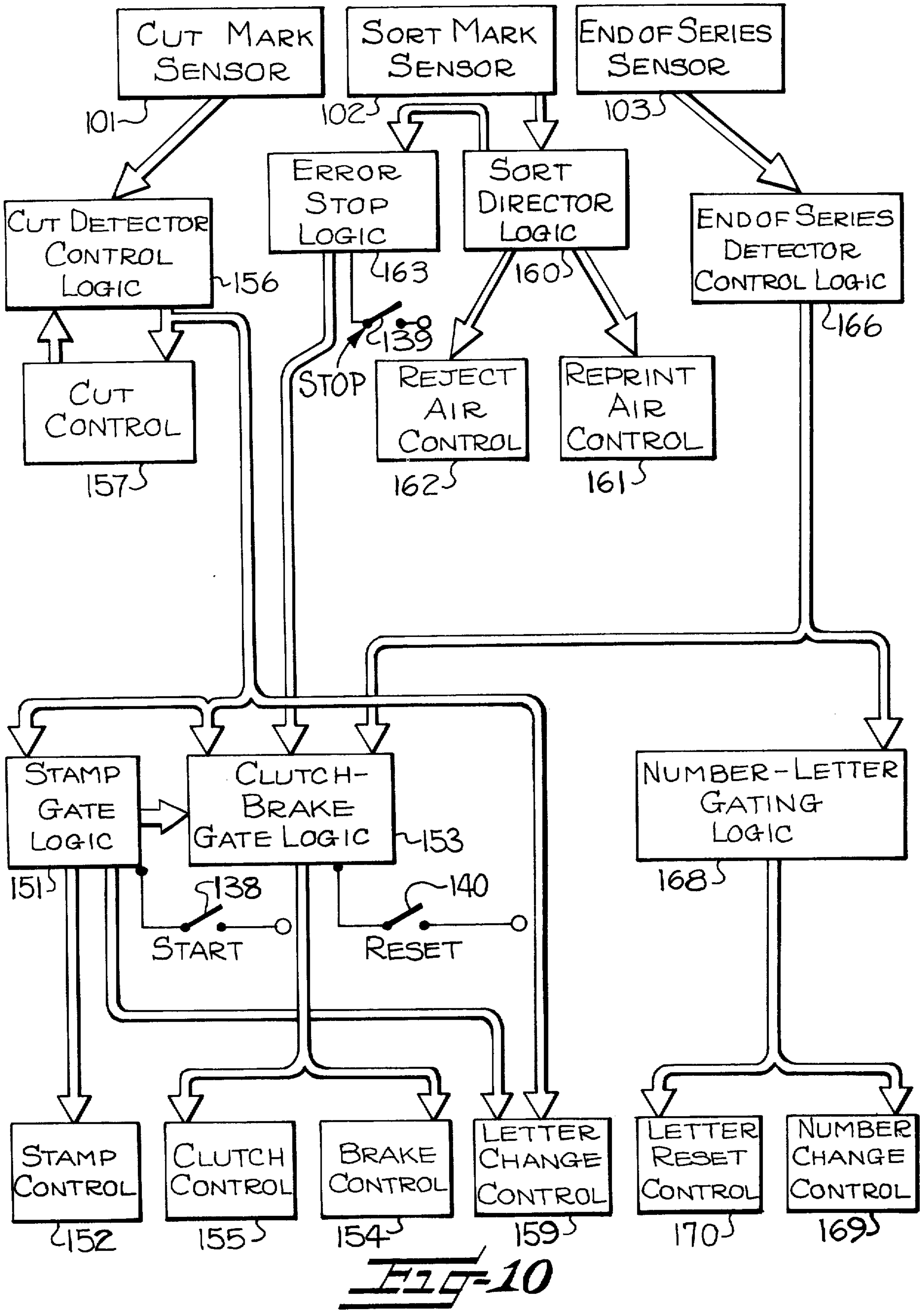
FIG. 10 is a schematic representation of an electrical control system adapted to be employed with the apparatus illustrated in FIGS. 1-5.

The operation of the apparatus will now be described with particular reference to FIG. 10. In this regard, it will be understood that the electrical circuits employed are conventional and well known to those skilled in the art, and for this reason the various circuits have been illustrated schematically in FIG. 10.

Initially, the operator threads the paper strip through the apparatus, and then manually sets the number in the numbering unit according to a control sheet which accompanies the roll 33. The master off-on switch 137 is then closed to energize the circuits shown in FIG. 10 and start the motors 45 and 112. The start button 138, which alternately may be in the form of a foot switch, is then closed to energize the stamp gate logic circuit 151 which in turn signals the stamp control 152 to print the number and pose letter which has been set in the numbering unit 58 by the operator. In addition, the stamp gate logic circuit 151 signals the clutch-brake gate logic circuit 153 which acts through the brake control 154 and clutch control 155 to release the brake 50 and engage the clutch 51. Thus upon closing of the start button 138, a number and letter are immediately stamped on the print, and the drive shaft 42 is then rotated to advance the film strip along its path of travel.

CUT MARK SEQUENCE

Upon a cut mark 22 being detected by the first sensor 101, a signal is sent to the cut detector control logic circuit 156, which in turn actuates the cut control 157. Simultaneously, the circuit 156 signals the clutch-brake gate logic circuit 153 to terminate the advance of the film strip, and signals the stamp gate logic circuit 151 to actuate the stamp contnrol 152 so that upon termination of the advance of the strip the numbering unit 58 prints a number and letter on the print positioned immediately above the cut mark and advances the stepping motor 71 for the ribbon 67. The stamp gate logic circuit 151 then also signals the letter change control circuit 159 to advance the letter in the numbering unit 58 to the next sequential letter (such letter advance occurring only after being applied to both of the prints 20 and 21 in the illustrated embodiment of the film strip 15).

The cut control circuit 157 actuates the first air solenoid valve 131 to direct air into the line 83 to thereby translate the piston 81 to the right as seen in FIG. 5 and effect the cutting operation. Upon termination of the cutting operation, the reed switch 99 is closed and this sends a reset signal to the cut detector control logic circuit 156 which in turn signals the clutch-brake gate logic circuit 153 to release the brake 50 and initiate the advance of the film strip 15. Thus upon sensing a cut mark 22, the advance of the strip is immediately terminated, a number is printed on the underside of the print located above the cutting mechanism, the print located below the cutting mechanism is severed from the strip, the letter in the numbering unit is advanced (where applicable), and the advance of the strip is again initiated. Assuming non-operation of the first and second air nozzles 118, 119, the severed print will then drop vertically into the first receptacle 121 which represents the satisfactory prints. Also, while the advance of the strip is immediately terminated upon sensing the cut mark, it will be appreciated that the strip will move forward somewhat before the brake 50 is able to bring the strip to a complete stop. For this reason, the sensor 101 is mounted about ⅛ to ¼ inch above the line of cut as noted above, whereby the cutting mechanism is able to cut substantially through the sensed cut mark and thereby ensure that the associated print is properly framed.

Unsatisfactory Print Sequence

In the event the second sensor 102 should detect a reprint mark 24, or a reject mark 25, or both (which represents a stop mark 26), on the advancing paper strip, a signal is sent to the sort director logic circuit 160. This circuit includes a suitable timing function which permits the circuit to determine which of the indicia has been sensed, and when for example the reprint mark 24 is sensed, a signal is sent to the reprint air control circuit 161 which, after a short programmed time delay, energizes the third air solenoid valve 133 so that air is directed through the first air nozzle 118 upon completion of the cutting operation. The leading edge of the severed print is thus directed into the second receptacle 122. After a short programmed period of operation, the control circuit 161 then terminates the air flow and resets the sensor. In the case of the illustrated embodiment of the film strip 15, it will be understood that the sort director logic circuit 160 will also be programmed to repeat the above sequence for the second print 21 of the pose to be reprinted.

Similarly, where a reject mark 25 is sensed, a signal is sent to the reject air control circuit 162 which energizes the second air solenoid valve 132 to direct air through the second air nozzle 119. Thus the severed print is directed into the third receptacle 123.

Finally, if the stop mark 26 is sensed, a signal is sent to the error stop logic circuit 163 which acts through the clutch-brake gate logic circuit 153 to prevent the reactuation of the film advance after the completion of the above described cutting operation. The operator will then have an opportunity to manually set the correct number in the numbering unit 58. When this is accomplished, the operator closes the reset button 140. The reset button 140 and circuit 163 acts to start the advance of the strip without actuating the numbering unit 58 on the next print, after which the cycle continues in the normal manner. This delay in numbering serves to avoid the numbering of the second print 21 which corresponds to the marked first print 20, and which is positioned immediately above the cutting mechanism when the apparatus stops. Thus the corrected number will be first applied to the first print 20 of the next pose.

End of Series Sequence

When an end of series mark 27 is detected by the third sensor 103, a signal is sent to the end of series detector control logic circuit 166. The circuit 166 in turn acts through the clutch-brake gate logic circuit 153 to prevent the reactuation of the film advance after the completion of the cutting operation (as in the case where a stop mark 26 is sensed). This permits the operator to collect the prints from the three receptacles, and package those prints which are satisfactory in an envelope 64 in the manner shown in FIG. 9.

The end of series detector control logic circuit 166 also signals the number-letter gating logic circuit 168 and thus the number change control 169 and letter reset control 170 to reset the pose letter to the initial letter (which is typically the letter A), and advance the numbering unit 58 to the next sequential number. To commence the advance of the strip, the operator then actuates the start button 138 to immediately stamp the new number and letter on the print located immediately above the cutting apparatus, and then advance the strip as described above.

As noted above, the front panel of the apparatus mounts several other controls numbered 141–144. These controls are optional and not essential to the operation of the present invention, and thus they will be only generally described herein. The indicator light 141 is designed to light whenever the apparatus is stopped and programmed to print the second print 21 rather than the first print 20. When the sort control switch 142 is closed, the start button 138 is by-passed such that the apparatus automatically advances after each cutting operation to thereby result in the continuous cyclical operation of the apparatus. When the numbering control switch 143 is closed, the numbering unit 58 is deactivated so that numbers are not printed on the strip. The cut button 144 provides a means for manually activating the cutting operation.

In the drawings and specification, there has been set forth a preferred embodiment of the invention, and although specific terms are employed, they are used in a generic and descriptive sense only and not for purposes of limitation.

That which is claimed is:

1. An apparatus for processing an elongated paper strip composed of a series of closely spaced photographic prints or the like and wherein the strip includes a cut mark positioned at a predetermined location with respect to the space between adjacent prints, a reprint mark positioned at a predetermined location with respect to those prints which have been selected to be reprinted, and a reject mark positioned at a predetermined location with respect to those prints which have been determined to be totally unsatisfactory, said apparatus comprising means for advancing the strip along a path of travel, said path of travel including a substantially vertical segment at the downstream end thereof, means positioned along said path of travel and responsive to said cut mark appearing on the advancing strip for severing the strip along the space between adjacent prints, first receptacle means positioned directly below the downstream end of said vertical segment of said path of travel for receiving the severed prints and forming a first stack thereof, second receptacle means positioned on one side of the downstream end of said vertical segment of said path of travel for receiving the severed prints and forming a second stack thereof, third receptacle means positioned on the other side of the downstream end of said vertical segment of said path of travel for receiving the severed prints and forming a third stack thereof, means positioned adjacent the downstream end of said vertical segment and responsive to said reprint mark appearing on the advancing strip for deflecting the associated severed print into said second receptacle means, said deflecting means comprising an air nozzle positioned adjacent the downstream end of said vertical segment of said path of travel and adapted to direct air laterally across said path of travel toward said second receptacle means, means for sensing the presence of a reprint mark on the advancing strip, and means responsive to a signal from said reprint sensing means for injecting air through said nozzle and against the leading end of the associated print, and means positioned adjacent the downstream end of said vertical segment and responsive to said reject mark appearing on the advancing strip for deflecting the associated severed print into said third receptacle means, whereby the satisfactory prints fall directly into said first receptacle to form a first stack, while the prints which require reprinting fall into said second receptacle to form a second stack, and while the prints which are totally unsatisfactory fall into said third receptacle to form a third stack.

2. The apparatus as defined in claim 1 further comprising means positioned along said path of travel and responsive to said cut mark appearing on the advancing strip for terminating the advance of the strip prior to the actuation of said severing means, and means responsive to the completion of the operation of said severing means for reactuating said advancing means.

3. The apparatus as defined in claim 2 wherein said printing means includes means for printing sequential letters on each of the prints in a related series of prints.

4. The apparatus as defined in claim 3 wherein said severing means is positioned immediately adjacent said cut mark sensing means such that the apparatus is adapted to sever the strip substantially through said cut mark.

5. The apparatus as defined in claim 2 wherein the elongated paper strip further includes a stop mark positioned at a predetermined location with respect to those prints which have been determined to require a stopping of the apparatus, and an end of series mark positioned at a predetermined location with respect to the final print in a related series of prints, and said apparatus further comprises control means responsive to either a stop mark or end of series mark appearing on the advancing strip for preventing re-actuation of said advancing means such that the strip remains stationary after the completion of the severing operation.

6. The apparatus as defined in claim 2 wherein said severing means comprises a fixed blade along one side of said path of travel, a rotatable cutting blade positioned along the other side of said path of travel and adapted to cooperate with said fixed blade, and means for sequentially rotating the rotatable cutting blade forwardly across the fixed blade and then rearwardly to its initial position.

7. The apparatus as defined in claim 6 wherein said terminating means is adapted to terminate the advance of the strip at a location wherein said cut mark is substantially aligned with said severing means and such that the strip is severed substantially through said cut mark.

8. The apparatus as defined in claim 2 wherein the elongated strip is adapted to include an end of series mark associated at a predetermined location with respect to the final print in a related series of prints, and said apparatus further includes means positioned along said path of travel for sensing the presence of an end of series mark, and means responsive to a signal from said end of series sensing means for preventing the reactuation of said advancing means after completion of the severing operation so that the operator may collect all of the severed prints in the related series.

9. The apparatus as defined in claim 8 wherein said apparatus further comprises means for printing a predetermined number on each of said prints in a related series of prints and for printing sequential letters on each of the prints in a related series, and means responsive to a signal from said end of series sensing means for advancing the predetermined number and resetting the letter to a preselected initial letter.

10. The apparatus as defined in claim 1 wherein said means for deflecting the prints into said third receptacle comprises a second air nozzle positioned adjacent the downstream end of said vertical segment of said path of travel and adapted to direct air laterally across said path of travel toward said third receptacle means, means for sensing the presence of a reject mark on the advancing strip, and means responsive to a signal from said reject sensing means for injecting the air through said second nozzle and against the leading end of the associated print.

11. The apparatus as defined in claim 1 wherein the elongated strip is adapted to include an end of series mark associated at a predetermined location with respect to the final print in a related series of prints, and said apparatus further includes means for sensing the presence of an end of series mark on the advancing strip, means for printing a predetermined number on each of said prints in a related series of prints, and means responsive to a signal from said end of series sensing means for advancing the predetermined number of said printing means, such that each related series of prints may be identified by a different number printed on all prints thereof.

* * * * *